(12) United States Patent
Graefe

(10) Patent No.: US 9,298,761 B2
(45) Date of Patent: Mar. 29, 2016

(54) ADAPTIVE MERGING IN DATABASE INDEXES

(75) Inventor: Goetz Graefe, Madison, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1749 days.

(21) Appl. No.: 12/433,418

(22) Filed: Apr. 30, 2009

(65) Prior Publication Data

US 2010/0281013 A1    Nov. 4, 2010

(51) Int. Cl.
G06F 7/00 (2006.01)
G06F 17/30 (2006.01)

(52) U.S. Cl.
CPC ................................ *G06F 17/30327* (2013.01)

(58) Field of Classification Search
None
See application file for complete search history.

(56) References Cited

U.S. PATENT DOCUMENTS

| | | | |
|---|---|---|---|
| 6,651,054 B1* | 11/2003 | de Judicibus | |
| 7,251,663 B1* | 7/2007 | Smith | |
| 7,315,981 B2* | 1/2008 | Nakamura et al. | 715/234 |
| 2004/0148293 A1* | 7/2004 | Croisettier et al. | 707/100 |
| 2006/0253429 A1* | 11/2006 | Raghavan et al. | 707/3 |
| 2007/0078813 A1* | 4/2007 | Beavin et al. | 707/2 |
| 2008/0086470 A1* | 4/2008 | Graefe | 707/8 |

OTHER PUBLICATIONS

Goetz Graefe, Sorting and Indexing with Partitioned B-Tree, 2003.*
Stratos Idreos, Martin Kersten, Stefa Manegold, Databse Cracking, Jan. 7, 2007, pp. 68-78.*
Ivanova, Milena et al.; "Adaptive Segmentation for Scientific Databases"; Apr. 2008; p. 1412-1414; IEEE; Cancun, MX.
Kersten, Martin et al.; "Cracking the Database Store"; Jan. 2005; CIDR; Asilomar, CA USA.
Idreos, Stratos et al.; "Database Cracking"; Jan. 2007; p. 68-78; CIDR; Asilomar, CA USA.
Ivanova, Milena et al; "Self-organizing Strategies for a Column-store Database"; EDBT; Mar. 2008; Nantes, France.
Graefe, Goetz; "Sorting and Indexing With Partitioned B-Trees"; Jan. 2003; CIDR; Asilomar, CA USA.

* cited by examiner

*Primary Examiner* — Hosain Alam
*Assistant Examiner* — Thu Nga Nguyen
(74) *Attorney, Agent, or Firm* — FabianVanCott

(57) ABSTRACT

A method for implementing adaptive merging in database indexes includes selecting a key range from a database query having a range predicate and searching a database for data matching the key range. The data matching the key range is merged to form a collected dataset which is stored for future retrieval. A method for optimizing B-tree representation of a database using actual queries is also provided.

16 Claims, 10 Drawing Sheets

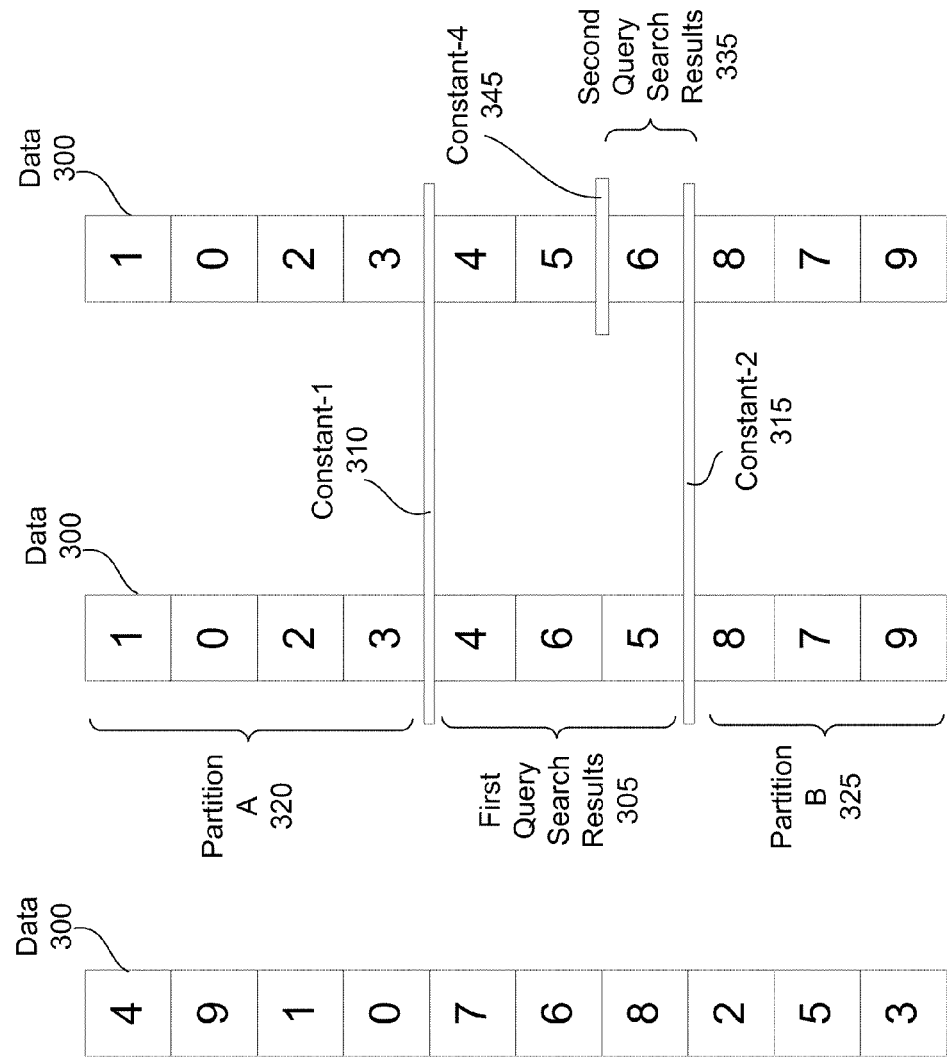

ADAPTIVE MERGING IN DATABASE INDEXES

BACKGROUND

Relational database indexes are representations of underlying data and provide a structure which allows for faster searches. The performance and maintainability of relational database indexes can depend on a number of factors including whether and how efficiently the index adapts to new data and to new query patterns. Ideally, the indexing technique would require very little effort during data import operations yet enable efficient index searches for tables and rows where frequently accessed data resides.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 3 is a diagram of an illustrative database cracking technique for optimizing data organization within a data table, according to one embodiment of principles described herein.

Throughout the drawings, identical reference numbers designate similar, but not necessarily identical, elements.

DETAILED DESCRIPTION

Figures 1, 2:
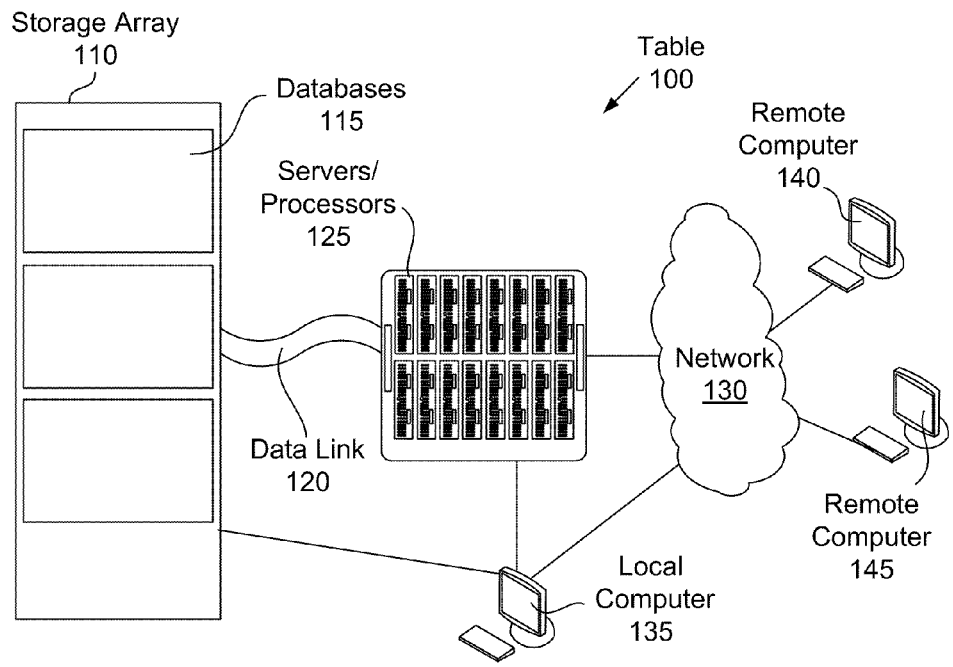
FIG. 1 is a diagram of an illustrative computer system which incorporates a database, according to one embodiment of principles described herein.
FIG. 2 is a diagram of an illustrative data table within a database, according to one embodiment of principles described herein.

There are several fundamental challenges in database indexing. In a database, all data may not have the same importance. For example, a portion of the data may be accessed regularly while another portion of the data is not queried at all. A data base index which treats all information as it were of equal importance can be inefficient because it attempts to index data which is seldom accessed with the same thoroughness as data which is accessed regularly. The effort and resource spent in indexing less important data is largely wasted.

Additionally, loading new data into a highly indexed database can be particularly expensive in terms of time and computational power. The contents of the new data are initially unknown by the database and not incorporated into its indices. In some embodiments, the entire set of indices for the database must be remade to incorporate and appropriately index the new data. During the re-indexing of the database, the system may be unable to respond to queries.

"Database cracking" adapts the physical database layout for and by actual queries. Only if and when a column is used in query predicates, a copy of the column is created. The "cracker index" is stored in disjoint key ranges and each range query partitions the key ranges containing the boundary keys of the present range predicate. The effect is akin to a sort that is adaptive and incremental but inefficient, in particular when applied to databases on block-access devices. In contrast, traditional index creation sorts everything with an efficient merge sort, but it is neither adaptive nor incremental.

This specification describes a technique for adaptive merging in database indexes. For purposes of explanation, the adaptive merging technique is described within the context of a partitioned B-tree index. This technique is an adaptive, incremental, and efficient method for indexes. An index structure optimized for local and incremental sorting and merging lets the merge activity focus on key ranges used in actual queries. The resulting index adapts more quickly to new data and to new query patterns than database cracking yet it enables better query performance, both in memory and on block-access storage. It also enables robust and cooperative techniques for concurrency control and recovery, e.g., instantly releasing locks conflicting with user transactions and logging merely space allocation but not data contents during reorganization. Throughout the specification, adaptive merging in the context of a partitioned B-tree is compared to database cracking to illustrate the differences and advantages of the adaptive merging technique.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Databases

FIG. 1 is a diagram of an illustrative computer system (100) which includes a storage array (110) containing a number of databases (115). The databases (115) contain information to support one or more functions of an organization using the computer system (100). For example, if the organization sells products to a number of customers, the database may contain information such as customer identifiers, customer contact information, order information, billing information, and inventory information. Although the storage array (110) and databases (115) are shown as being in a single location and physically cohesive, both the storage array (110) and the database (115) could be distributed over a number of locations and devices. A single database may contain millions or billions of data values.

A number of servers (125) may be connected to the storage array (110) via a data link (120). The servers (125) may contain database management software which facilitate queries to the databases (115), update the database information, provide database security, and other functions. The servers (125) may be connected to local computers (135) and remote computers (140, 145). These computers (135, 140, 145) may submit queries, new data, or commands to the servers. For example, a first remote computer (140) may be at sales location and communicate new data through a network (130) to the servers (125). This information may include new customer, sales, and inventory data. A second remote computer (145) may be located at a corporate office and may submit database queries to the servers (125) which then search the databases (115) to return relevant results. For example, an executive may submit a request to view all customer accounts which have been unpaid for 90 days and have a balance greater than 1000 dollars. The servers (125) then search through the databases (115) to find all data which matches the query parameters. A variety of techniques can be used to organize the data within the databases to facilitate maintenance and search functions.

FIG. 2 is a diagram of one illustrative embodiment of a table (200) which contains a number of columns (215) and rows (220). The data is organized within these columns (215) and rows (220) according to a number of attributes (205) which are shown in the first row of the table. The attribute identifiers (205) may include a customer identifier in a first column and other data associated with this customer in the following columns. For example, the telephone number of the customer could be shown in a second column, the address in a third column, and so forth. One or more attributes may be selected as a key data column (210) to which all other data attributes are matched. For example, information associated with a customer identifier would appear in the row labeled with this customer identifier. The values within the key data column (210) may or may not be sorted within the table (200).

This very straightforward approach to database organization has several advantages. To import new data into the database, millions or billions of rows can be directly added to the table (200). Both the old and new rows are immediately available for query processing. However, searching for a database record which fulfills a query predicate can be very time consuming as all rows in the table must be searched. For example, if user submits a request to view all customer accounts which have been unpaid for 90 days and have a balance greater than 1000 dollars, the database software must search the entire table to find the relevant customer accounts. Consequently, it can be very time consuming and expensive to search a database, but very inexpensive to add new data.

An index allows a database server to find and retrieve specific rows much faster than it could without using the index. A sequential or linear scan from the beginning of a database table, comparing each record along the way, can be very slow compared to using an index. For a table of even moderate size, such an approach yields unacceptable performance. As a result, virtually all modern-day relational database systems employ various indexes to greatly reduce time and effort required to search the database. These indexes may be manually or automatically generated. In many circumstances, the sheer number of queries and of possible indexes to support these queries makes manual generation and tuning of indexes impractical, in particular if partial indexes are considered that focus on frequently requested information. The most traditional solution is to build an entire index all at once without any provision that some data (e.g. the most active data) can be more fully indexed than other data.

Database Cracking

"Database cracking" has been proposed for focused, incremental, automatic optimization within a relational database. In database cracking, the more often a key range is queried, the more its representation is optimized for future queries. This optimization is entirely automatic and continues to improve when queries are made over key ranges which not yet fully optimized.

Database cracking relies on partitioning unsorted data into key ranges. Such range partitioning is akin to sorting, but database cracking stops short of sorting a table to completion. Database cracking combines features of both automatic index selection and partial indexes. When a column is used in a predicate for the first time, a cracker index is created by copying the appropriate data values from the table's primary data structure. When the same column is used in the predicate of another query, the cracker index is refined as long as finer granularity of key ranges is deemed advantageous.

The keys in a cracker index are partitioned into disjoint key ranges and unsorted within each. As illustrated in FIG. 3, each range query analyzes the cracker index, scans the key ranges that fall entirely within the query range, and uses the two end points of the query range to further partition the appropriate two key ranges. Thus, in most cases, each partitioning step creates two new sub-partitions using logic very similar to the partitioning step in a quicksort algorithm. A range is partitioned into 3 new sub-partitions if both end points fall into the same key range. This happens during the first partitioning step in a cracker index (because there is only one key range encompassing all key values) but is not likely thereafter.

FIG. 3 shows a simplified numeric example of database cracking. The data (300) is initially an unordered column containing ten numbers, as shown on the left. The first query is for all numbers between and including 4 and 6. Constant-1 (310) is 4 and constant-2 (310) is 6. The server accesses the database and reads all ten slots in the data (300). The server applies the search criteria, deciding if each number is less than constant-1 (310), greater than constant-2 (315) or in between constant (310) and constant-2 (315). It then rewrites the data values into three partitions: partition A (320) which contains numbers less than 4, partition B (325) which contains numbers greater than 6, and the first query search results which contains number less than or equal to 6 and number which are greater than or equal to 4. The data within each partition are unsorted.

A second query is made for numbers between and including 4 and 5. In this query, the predicate range is entirely within the previous query results. Consequently, the database software must only read and write the three slots in the first query search results (305) rather than the entire column of data (300). In large arrays, this can result in significant time savings. As the second query is performed, the data is partitioned further. In this case, there are only two partitions created because the lower bound ("4") of the search is equal to constant-1 (310). In the example of FIG. 3, the second query results in further range partitioning of the first query's search results. As shown in by the very simple example in FIG. 3, data which is repeatedly queried is better organized and faster to access than data which is less often queried.

Data cracking is designed to: burden each query with some data organization in order to achieve greater efficiency in subsequent queries; to spend effort only on data that is actively queried and to ignore data of low interest; and to control the entire reorganization process by a simple, robust heuristic. Data cracking has the advantages of being self-tuning, self-terminating, adaptive to changing active key ranges, having automatic index creation using the search boundaries, and may eventually produce sorted final data.

However, database cracking can have significant shortcomings. First, database cracking requires many steps to reach the final representation for a key range, even if no further cracking is applied to minimal partitions smaller than a pre-determined size, say 4 MB. Thus, optimization of newly loaded data and adaptation to a new focus of query activity are much slower and more expensive than they ought to be. Second, the efficiency of transforming an initial data representation into a fully optimized one depends on the query pattern. If initial queries and their range predicates fail to partition the data evenly, the value of each partitioning step is further decreased. Third, search efficiency never reaches that of a traditional index if cracking leaves unsorted minimal partitions, say 4 megabyte (MB). While a traditional index permits binary search with $\log_2(N)$ comparisons among N records, the expected cost for a linear search in an unsorted minimal partition is N/2 comparisons (assuming foreknowledge of precisely one match) or N comparisons (without assuming such foreknowledge). For example, with 65,000 records in a partition (4 MB÷60 B), the difference is 16 versus 32,500 comparisons or a factor 2,000. Fourth, database cracking works well for in-memory databases but not for block-access storage.

B-Tree Index

Adaptive merging in partitioned B-trees is a new technique that overcomes these weaknesses. It differs from database cracking as it is based on merging (as in a merge sort) rather than on partitioning (as used in quicksort). Its performance advantages are substantial both during adaptation when the focus of query activity shifts to a new key range and during individual queries against a fully optimized data representation.

Figure 4A:
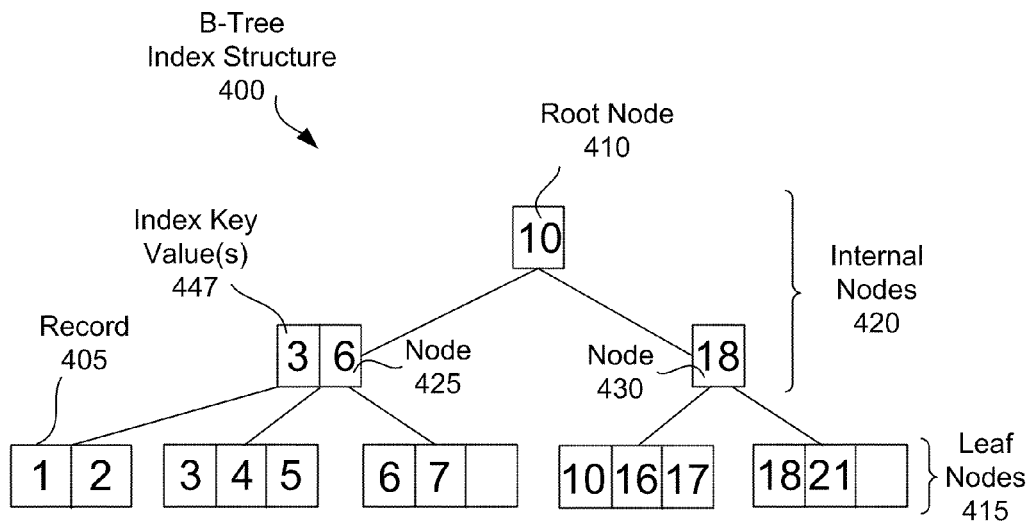
FIGS. 4A-4B are diagrams showing a B-tree technique for indexing data within a database, according to one embodiment of principles described herein.
Figure 4B:
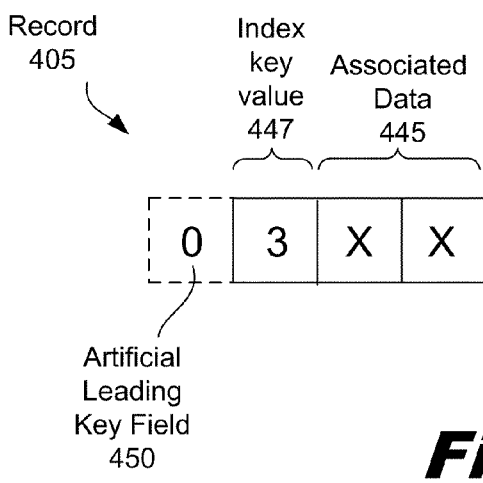

FIGS. 4A and 4B are illustrative diagrams of a B-tree index structure (400) and an index key (440), respectively. Both are referred to internally by the system for locating and displaying records in a database file. FIG. 4A is an illustrative diagram of a B-tree. A B-tree is an ordered tree data structure which is made up of a set of linked nodes. According to one illustrative embodiment, a root node (410) is at the apex of the B-tree structure (400). In this example, the root node (410) has two child nodes (425, 430). Each of the child nodes (425, 430) may have a number of leaf nodes (415). Leaf nodes (415) are the nodes which are the farthest removed from the root node (410). Leaf nodes (415) do not have child nodes. Internal nodes (420) include all nodes in B-tree (400) which are not leaf nodes (415). The number of internal nodes between the root and a leaf is the same for all leaf nodes in a B-tree.

To find a record with a particular key value, the search algorithm moves through the tree, starting at the root node, comparing key values stored at each node visited with the key value sought. The results of each comparison operation, in conjunction with the pointers stored with each node, indicate which path to take through the tree to reach the record ultimately desired. Ultimately, a search may end at a particular leaf node which will, in turn, point to (i.e., store a pointer to or identifier for) a particular data record for the key value sought. Alternatively, the leaf nodes for "clustered indexes" store the actual data of the data records on the leaf nodes themselves.

Partitioned B-Trees

The adaptive merging and other related techniques described in this specification can be applied to partitioned B-trees, which are variants of traditional B-tree indexes. As described below, the adaptive merging and related techniques can also be profitably applied in a number of other situations or data structures.

FIG. 4B is a diagram showing an illustrative record (405) in a partitioned B-tree. According to one illustrative embodiment, each record (405) within a B-Tree index (400) contains an index key value (447) and associated data (445). The index key value (447) is a value or values around which the B-tree index (400) is organized. Searches which contain predicates pertaining to the index key values indexed by the B-tree can be efficiently answered using the B-tree index. For example, if a query requests all customer data associated with a customer number "3," the search algorithm maneuvers through the B-tree structure (400) until it reaches the record (405) which contains the index key value (447) of "3". The associated data is then used to fulfill the search request.

Partitioned B-trees add an artificial leading key field (450) to B-tree records (405). This artificial leading key field (450) can be used to significantly increase the flexibility of the B-tree data structure by allowing it to be partitioned. Different values within the artificial leading key field (450) define partitions within the B-tree. For example, in FIG. 4B, artificial leading key field (450) contains a value of "0," indicating that the record is within a partition "0" within the B-tree structure. Partitions appear and disappear due to record insertion and deletion, with no catalog modification. Records with the same value in the artificial leading key field are in the same partition and can be searched as efficiently as in a traditional B-tree. When relevant data is distributed among multiple partitions, each partition is searched to return the complete set of results which match the query predicate. The desired steady state of a partitioned B-tree is to have only a single partition. This allows for the highest query performance, because only one partition must be searched. Temporary additional partitions enable optimizations during index creation, roll-in (loading), and roll-out (purging). Moreover, external merge sort can store runs in B-tree partitions with benefits for deep read-ahead, pause-and-resume, dynamic resource management, etc. Reorganization and optimization from multiple partitions to a single one uses the same merge logic as traditional external merge sort.

Figure 5A:
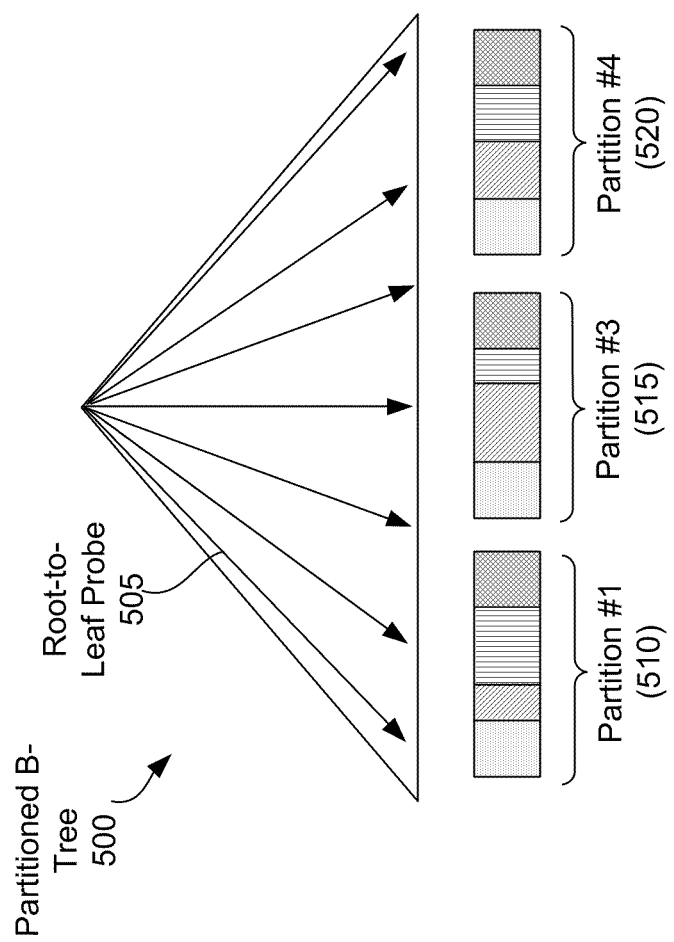
FIG. 5A is a diagram showing an illustrative search of a partitioned B-tree, according to one embodiment of principles described herein.

FIG. 5A illustrates a partitioned B-tree (500) as a triangle. The apex of the triangle represents the root node (410, FIG. 4A) of the partitioned B-tree (500). The leaf nodes (415, FIG. 4A) are represented as the base of the triangle. Partitions (510, 515, 520) are illustrated as sequences of shaded boxes. As discussed above, each partition is created by inserting at least one record with a value in the artificial leading key field (450, FIG. 4B). For example, all records (405, FIG. 4B) which contain an artificial leading key field (450, FIG. 4B) with a value of "1" are within partition #1 (510). Each shaded box within the partition represents a key range. Equal shading is meant to illustrate equal key ranges (when the artificial leading key field is disregarded). A query enumerates the partitions and searches each one. A root-to-leaf probe is required to find the next actual value in the artificial leading key field and another probe is required to apply the query predicate within the partition. Creating partitions using the artificial leading key field has the advantage that the data itself is not manipulated or copied to form the partitions. Rather, the index keys (440) are identified and grouped by setting the artificial leading key value.

In many situations, the cost of storing and manipulating the artificial leading key can be minimal. If prefix truncation (prefix compression) is employed in each leaf page, the storage overhead of a run number in each record can be negligible. Inasmuch as the partitions in the B-tree are interpreted as runs in an external merge sort, the artificial leading key field represents the run number.

The speed with which new data can be added to a partitioned B-tree index is primarily limited by the hardware bandwidth. While loading data into an initially empty table and an associated partitioned B-tree index, the readily available memory is used for run generation using an in-memory sort algorithm such as quicksort or a priority queue. According to one illustrative embodiment, run size and thus partition size in the partitioned B-tree can be approximately twice the memory allocation employed. The loading operation includes run generation, which provides the ability to perform an efficient search within each partition immediately after the data is loaded. When loading and thus run generation are complete, the database is immediately ready for querying, even if the data representation is not yet optimized.

Adaptive Merging

According to one illustrative embodiment, adaptive merging is to employ partitioned B-trees in a novel way, namely to focus merge steps on those key ranges that are relevant to actual queries, to leave all other key ranges in their initial places, and to integrate the merge logic as side effect into query execution. Thus, adaptive merging is like database cracking as it is similarly adaptive and incremental but they differ fundamentally as one relies on merging whereas the other relies on partitioning. The differences in query performance are due to data being kept sorted at all times in a partitioned B-tree. The difference in reorganization performance, i.e., the number of queries required before a key range is fully optimized, is due primarily to merging with a high fan-in as opposed to database cracking partitioning which has a low fan-out of 2 or 3. There are a number of other factors which may influence the difference in optimization efforts between database cracking and adaptive merging. For example, the preliminary organization performed during run generation in the adaptive merging technique may give it an advantage over database cracking which begins with an unsorted array. Another example may be that merging is applied to an entire key range in the illustrative adaptive merging technique, while database cracking partitions only two pre-existing partitions that contain the boundary keys of the current query range. These and other illustrative advantages of adaptive merging are explained in more detail below.

Initial Index Creation

The initial format of a partitioned B-tree may consist of many partitions. Each partition is sorted, but the partitions most likely overlap in their key ranges. Subsequent merging brings the partitioned B-tree closer to a single sort sequence in a single partition, as described later.

Figure 5B:
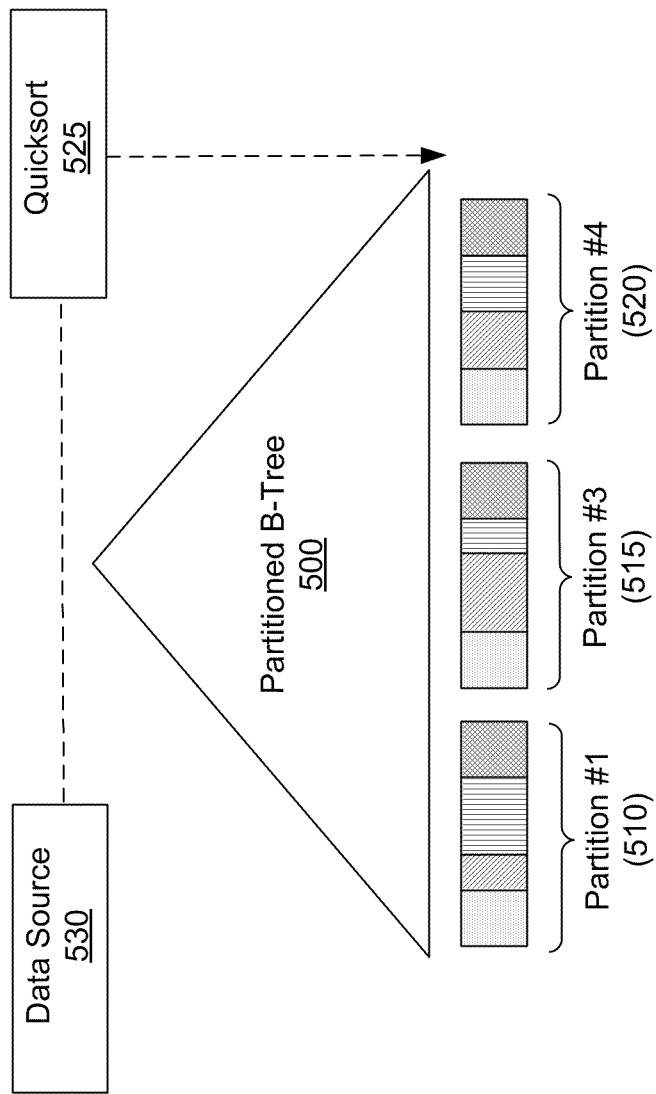
FIG. 5B is a diagram showing an illustrative addition of data to a partitioned B-tree, according to one embodiment of principles described herein.

FIG. 5B illustrates the initial loading and creation of a partitioned B-tree (500). The initial creation of a new partitioned B-tree retrieves data from a data source (530) and performs run generation using an in-memory algorithm such as quicksort (525) or replacement selection. The advantage of the latter is the opportunity for runs larger than the memory allocation during initial index creation. Each run forms a partition in the new B-tree (500). A run generation algorithm, such as quicksort (525) is used to append as many partitions as necessary. The number of partitions may depend on a number of factors, including data input size, memory allocation, sort algorithm, and any incidental correlation between the sort order in the data source and in the new index.

Search performance immediately after index creation depends on the count (and thus the average size) of partitions, as does the break-even point between probing each partition with a traditional B-tree search and an end-to-end scan of the index. For example, if scan bandwidth is 100 MB/s and each probe takes 20 ms, partitions larger than 100 MB/s×20 ms=2 MB ought to be probed rather than scanned, corresponding to a modest memory allocation of 1 MB during run generation by replacement selection. Note that the "lock footprint" can be smaller during probing than during scanning, further favoring probing over scans. Modern flash storage also favors probing over scans. Nonetheless, scanning is always possible if desired, e.g., in order to exploit shared scans.

Incremental Index Optimization

When a column is used in a predicate after the initial index creation, an appropriate index exists, albeit not yet fully optimized and merged into a single partition. In this situation, a first query examines each partition to find records which match its predicate, typically by probing within B-tree for the low end of the query range and then scanning to the high end.

Instead of just scanning the desired key range one partition at a time, however, the query might as well scan multiple partitions in an interleaved way, merge these multiple sorted streams into a single sorted stream, write those records into a new partition within the partitioned B-tree, and also return those records as the query result. The data volume touched and moved is limited to the size of the first query result.

Figure 6:
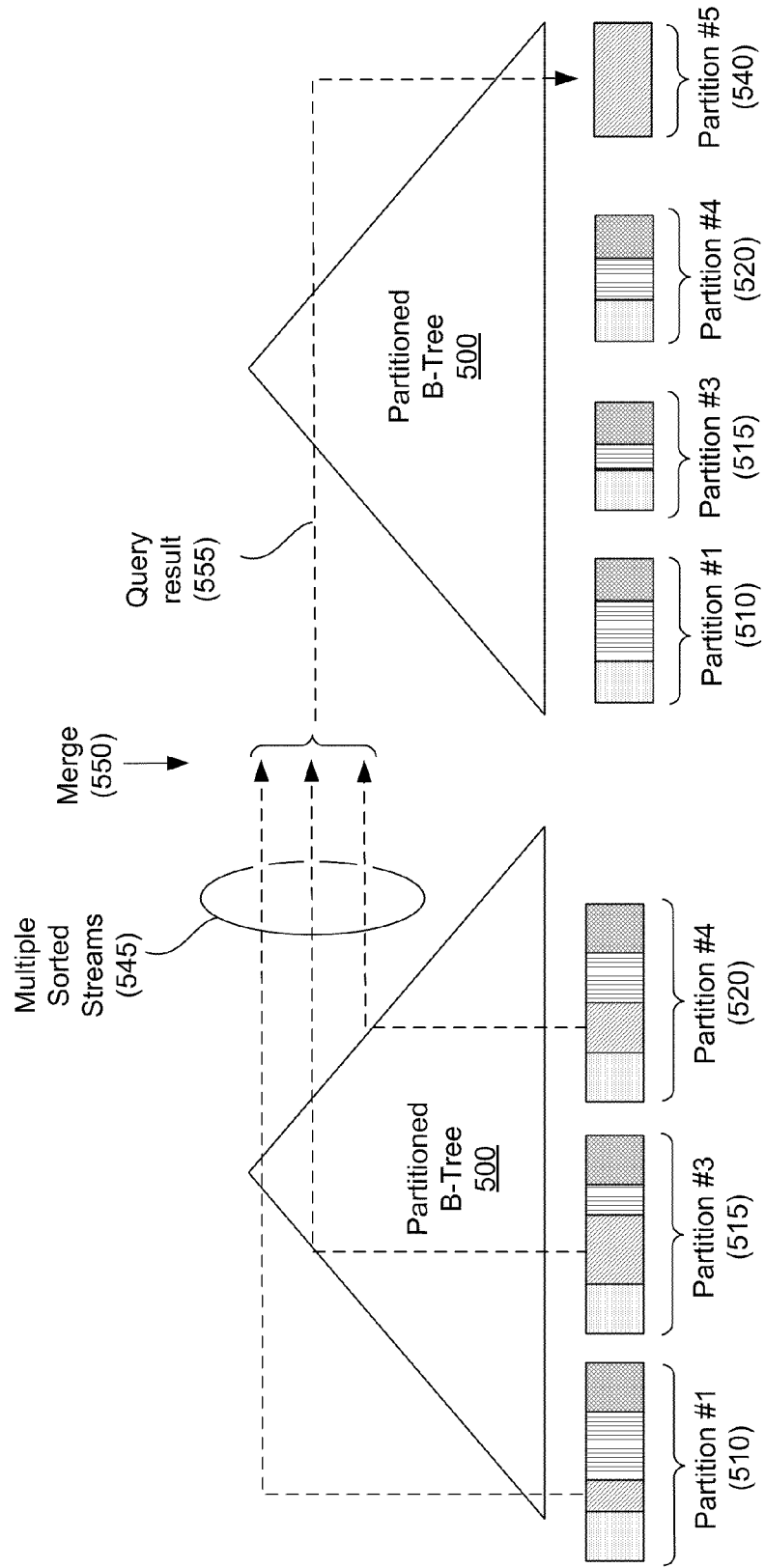
FIG. 6 is a diagram of illustrative adaptive merging technique within a partitioned B-tree, according to one embodiment of principles described herein.

FIG. 6 illustrates adaptive merging and data movement during the query. The left side shows the partitioned B-tree (500) when the query starts. In processing the query, records from the partitions (510, 515, 520) satisfying the query predicate (or a key range within the query predicate) create multiple sorted streams (545). In FIG. 6, the query predicate identifies key ranges within the partitions identified by a diagonally lined box within each partition. This data forms multiple sorted streams (545) that form a query result (555). The query result (555) is returned as the answer to the query. Additionally, the individual sorted streams in query result (555) are merged into a collected data set and written into a new partition #5 (540). This collected data set is stored in the new partition #5 (540) for future retrieval. The data volume touched and moved is limited to the size of the query result. In this case the data volume indicated by the diagonally lined boxes is removed from partitions (510, 515, 520) and placed in the new partition #5 (540). Ideally, a single merge step suffices to merge records from all existing partitions into single new partition.

If all existing partitions can be merged to form a single partition in a single step, i.e., if the number of initial partitions is smaller than the fan-in as limited by the memory allocation available for merging, then the query may leave the keys within its query range in a single location comparable to a traditional, fully optimized B-tree index.

If the query range of a subsequent query is a subset of that of a prior query, the subsequent query can search the new partition as efficiently in a partitioned B-tree as in a traditional B-tree. For example, if the subsequent query predicate was a subset of the query which generated partition #5 (540), the query would only require searching partition #5 (540). However, if the query ranges of the later queries do not overlap, it leaves its result behind in the same format as the second query for the benefit of the future queries. In this case, multiple queries can merge their output into the same new partitions.

This logic also applies to individual key ranges. If the range predicates of the second and third queries overlap partially, the new query needs to split its key range into overlapping and non-overlapping sub-ranges. For overlapping key ranges, the new query finds all data in a single location comparable to a traditional B-tree. For non-overlapping key ranges, it probes all existing partitions, extracts the required records, merges them, and moves them to a new partition, as shown in FIG. 6.

All subsequent queries also must analyze their range predicates for overlap with prior queries and the merge effort they applied to the index. Once all records within a key range have been merged into a single partition, subsequent queries in that key range work and perform like queries using a traditional B-tree index.

Key ranges without query activity are never reorganized or merged. Those keys remain in the initial runs produced by run generation. Thus, as in database cracking, no effort is wasted on inactive key ranges after the initial copy step. By adaptively merging only those key ranges actually queried, and by performing merge steps as side effects of query execution, adaptive merging in partitioned B-trees preserves the main strengths of database cracking. The main difference is in the speed of adaptation, i.e., the number of times each record is moved before it is in its final location.

If more than a single merge step is required to transform the B-tree index from many initial partitions into a single final partition, each key range must be searched and merged by multiple queries before it is in its final, completely optimized format.

The number of merge steps for each key range is equivalent to the merge depth in an external merge sort, i.e., $\log_F(W)$ for $W$ initial runs merged with fan-in F. With the memory sizes of modern computers, sort operations with a single merge step are common, and sort operations with more than two merge levels are quite unusual. Just as in external merge sort with optimized merge patterns, the merge depth may not be uniform for all records and thus the average merge depth might be a fraction, e.g., 1¾.

In fact, the number of merge steps per record is a significant difference between database cracking and adaptive merging in partitioned B-trees. The merge fan-in can easily exceed 100, whereas the partitioning fan-out in database cracking is usually 2 or 3. Thus, database cracking may move each record many times before its final place is found. The exact number depends on the size of partitions to which no further cracking is applied and the size of the initial partitions in the proposed design.

For example, if the size of the cracked index is 1 gigabytes (GB), if partitions smaller than 4 MB are no further partitioned, and the partitioning fan-out is 2, no further partitioning is required for a key range after $\log_2(1\,GB \div 4\,MB) = \log_2 256 = 8$ partitioning steps affecting this key range—even more if skew is an issue. In partitioned B-trees with adaptive merging, if the average size of the initial runs is 16 MB and the merge fan-in is 64, then the number of merge levels is $\log_{64}(1\,GB \div 16\,MB) = \log_{64} 64 = 1$. In other words, in this example, database cracking moves each record 8 times before its final location is found, whereas adaptive merging requires just a single move. Other numeric examples produce similar differences as long as the merge fan-in is much larger than 2.

Figure 7:
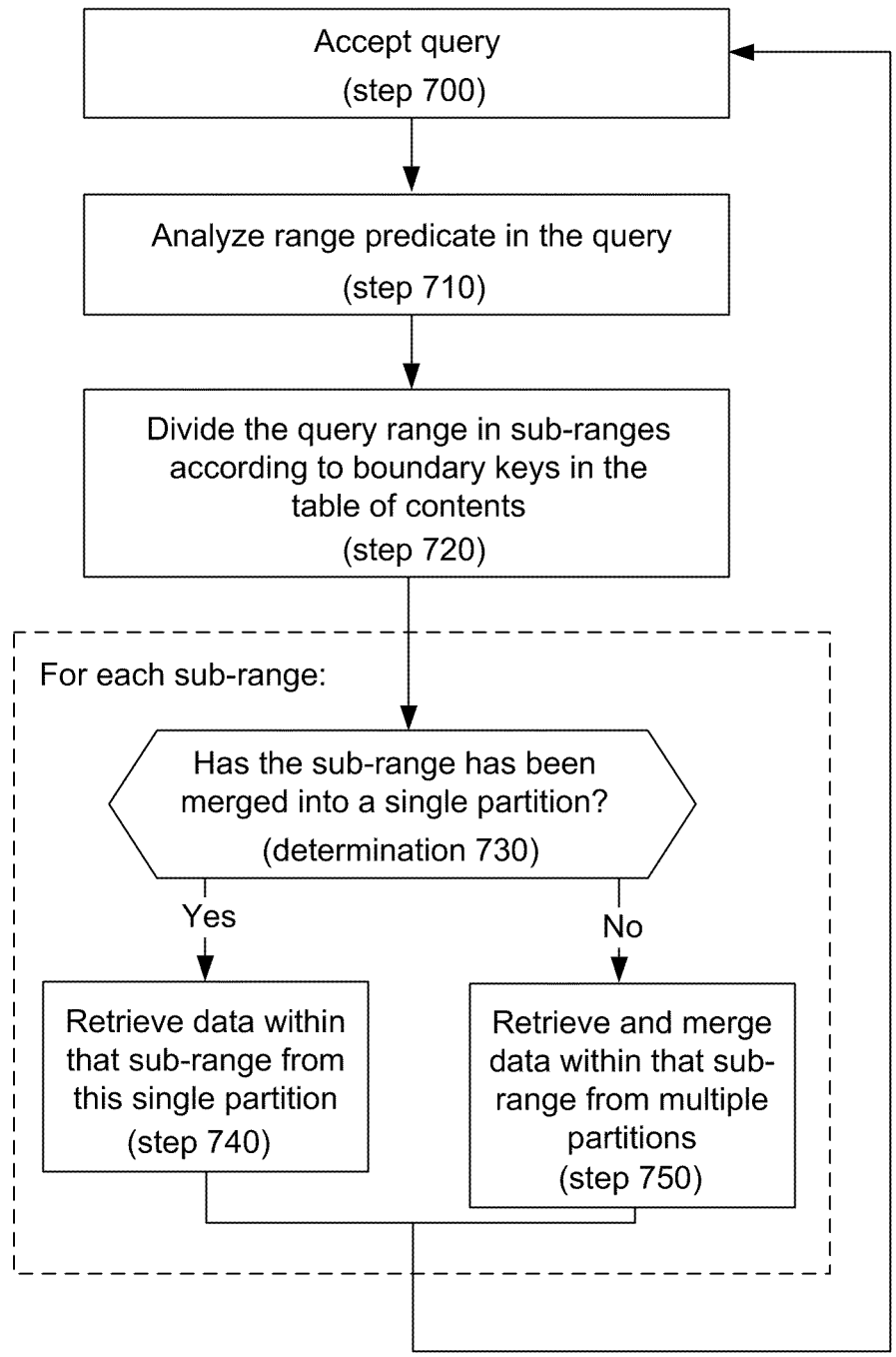
FIG. 7 is a flow chart showing one illustrative method for adaptive merging, according to one embodiment of principles described herein.

FIG. 7 is a flow chart of an illustrative method for adaptive merging within a partitioned B-tree index. In a first step, a query is accepted by the algorithm (step 700). The algorithm analyzes the range predicate in the query (step (710) and divides the query range into sub-ranges according to boundary keys in the index table of contents (step 720). For each sub-range, the algorithm determines if the sub-range has already been merged into a single partition or not. If the sub-range has been merged into a single partition, the data within that sub-range is retrieved from a single partition (step 740). If the sub-range has not been merged into a single partition, data within the sub-range is retrieved from multiple partitions and merged (step 750). The process is then repeated for the next query.

Table of Contents

As in database cracking, an auxiliary data structure is required to retain information about reorganization efforts already completed. In fact, the set of keys is the same in the auxiliary data structures for database cracking and for adaptive merging in partitioned B-trees. The information associated with those keys differs. In database cracking, the start position of the partition with the given is indicated. In adaptive merging, the data structure indicates the range of identifiers for partitions with records in the given key range.

For example, suppose that run generation creates runs with identifiers 1-1,000. All key ranges can be found in this set of partitions. After a key range has been merged once, say with merge fan-in 32, records within this key range can be found in partitions 1,001-1,032 but not longer in partitions 1-1,000. A key range merged twice can be found only in partition 1,033. Query performance in such key ranges equals traditional B-trees.

Updates

This section describes techniques for insertions, deletions, and record modifications that leverage adaptive merging techniques. Insertions can be placed either into the final target partition or they can be gathered in a new partition dedicated to gathering insertions. This partition ought to remain in the buffer pool such that all insertions only update in-memory data structures (other than the recovery log). Multiple new partitions may be added over time. Deletions can either search for the appropriate record in the index, in whatever partition it might be found, or they insert "anti-matter" quite similar to the "negative" records employed during maintenance of materialized views and during online index creation. Modifications of existing records can be processed either as traditional updates after an appropriate search or they can be processed as pairs of deletion and insertion, with alternative processing techniques as outlined above. If insertions, deletions, or updates create new partitions in a B-tree, i.e., introduce new partition identifiers, those partitions and their key ranges are reflected in the table of contents such that subsequent queries search in all appropriate partitions.

Automatic Index Generation

According to one illustrative embodiment, the algorithm automatically generates new indexes based on queries it receives. When a column is used in a predicate for the first time, a new index is created by copying appropriate values. For example, the algorithm which is initially organized around queries to column X receives a query for data from column Y. The algorithm scans the old B-tree organization or the underlying data, performs run generation on column Y, and writes the initial data index organized on column Y. Subsequent queries on Y further refine this data index by merging the active key ranges. The data index on column X may be retained or not.

Figure 8:
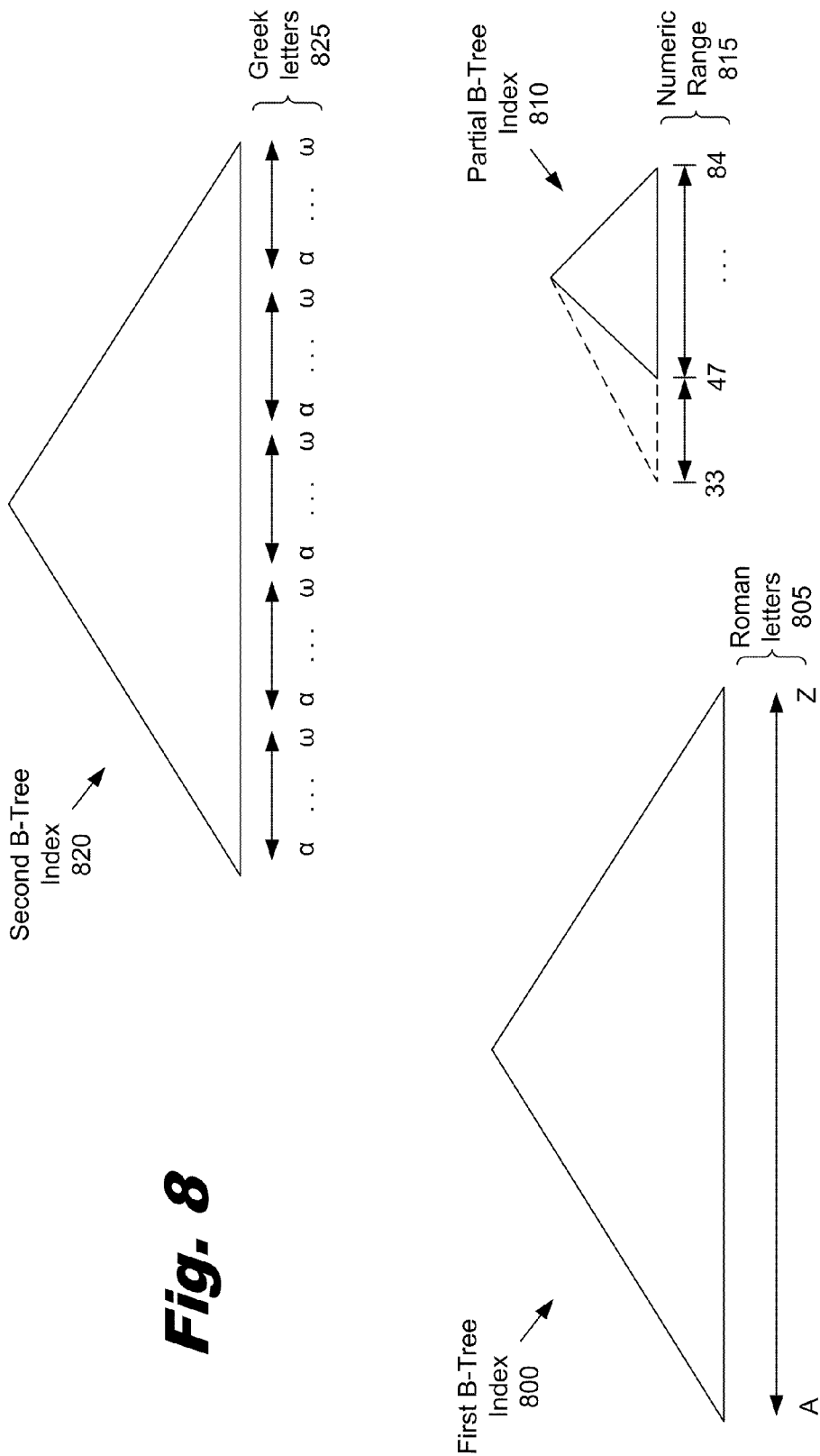
FIG. 8 is a diagram showing illustrative automatic index creation within a B-tree, according to one embodiment of principles described herein.

FIG. 8 illustrates a partitioned B-tree algorithm which provides automatic index generation which is optimized for and by actual queries. FIG. 8 shows a number of indexes (800, 810, 820) which reference the same underlying data. The first B-tree index (800) references the underlying data according to roman letters (805) which have a range from A to Z. If, for example, a query is made for a range of Greek letters, the first B-tree index (800) will be less effective in delivering the desired data locations. However, as a result of the query, a second index (820) may be created. The second index (820) may contain a number of partitions which reference various data elements using Greek letters (825). When a query is repeated for data within a range of Greek letters (825), the second B-tree index (820) will be available to more efficiently index the underlying data.

In some circumstances, a partial B-tree index (810) may be created. For example, if a query is made for all data within a numeric range (815) from 47 to 84, a third partial B-tree index (810) may be created and populated with the results from that search. Subsequent queries based on numeric ranges can be appended as new partitions to the partial B-Tree index (810) and subsequently merged into the original partition. For example, if a subsequent query requested data within a numeric range which extends from 33 to 47, this data could be appended to the original partition as shown in FIG. 8.

Partial indexes are only one illustrative technique can be used in adaptive merging of partitioned B-trees. Other orthogonal techniques include materialized views and their indexes, partitioning of an index into multiple B-trees, and other suitable techniques. When an index is partitioned into multiple B-trees, adaptive merging can be applied within each individual B-tree.

Concurrency Control

Concurrency control focuses on ensuring correct results for concurrent operations. For example, a first database transaction may be attempting to write a value to a data field while a second database transaction is attempting to delete the value from the same data field. If the two operations are not performed in the proper serialized order, the integrity of the database can be compromised. This is only one example of a concurrency conflict. A variety of other concurrency conflict situations can also arise.

According to one illustrative embodiment, when a conflict occurs between a data optimization action and a query execution within an adaptive merging algorithm, query execution simply proceeds without the side effect of data optimization. Data optimization by merging partitions as side effect of query processing occurs only when it can be done without concurrency control conflicts with other transactions. Of course, if two transactions and their range queries can be coordinated because the ranges abut or overlap, one may proceed with the reorganization and the other may benefit from it immediately.

Another consideration in concurrency control within a partitioned B-tree is that data optimization, reorganization, and merging (whatever term one prefers) happens in a different transactional context than the query. If the query is part of a transaction that eventually rolls back, there is no need to roll back the data optimization. This is also the reason why the data optimization desired by two different queries can readily be combined if their query ranges overlap—there will be transaction contexts for the queries and a third one for the merge activity. Finally, this is the reason why a read-only transaction might invoke a query with optimization side effects yet remain a read-only transaction.

Figure 9:
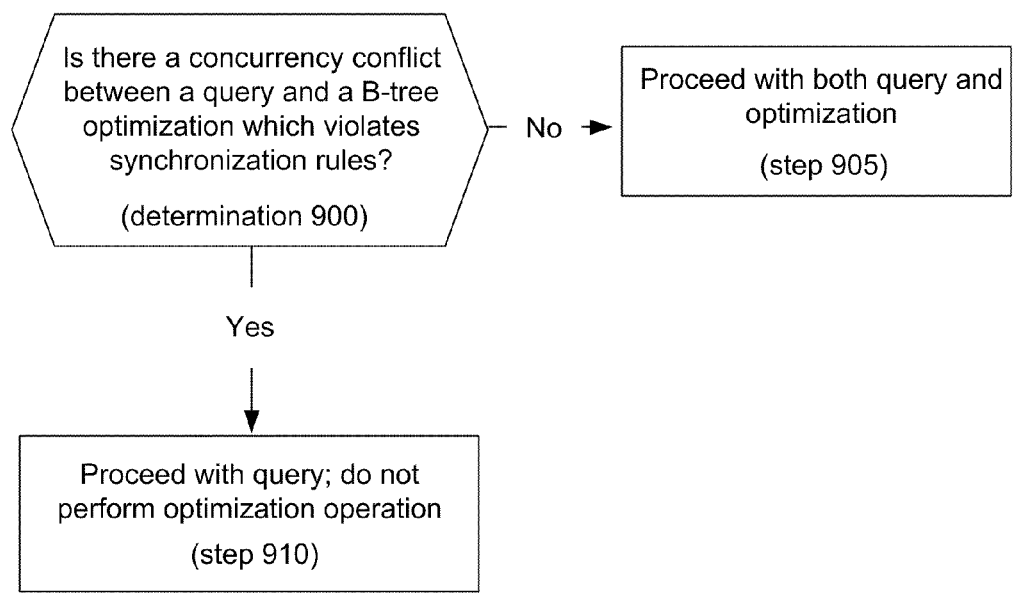
FIG. 9 is a flow chart showing one illustrative method for concurrency control within a partitioned B-tree, according to one embodiment of principles described herein.

FIG. 9 is a flow chart of one illustrative method for concurrency control within a partition B-tree index. During the operation of a B-tree algorithm, an ongoing evaluation of concurrency conflicts between queries and index optimization can be performed (determination 900). If there is no concurrency conflict, both the query and the optimization proceed (step 905). If there is a concurrency conflict between a query and a B-tree optimization, the query proceeds, but the optimization operation is not performed (step 910). This successfully resolves the concurrency issue at the price of giving up potential efficiency gains which may have been produced by the aborted optimization operation.

Similarly, if there is a conflict between two or more optimization operations, the optimization operations can simply not be performed. The integrity of the B-tree index is not compromised and subsequent searches can be performed at a possibly lower level of efficiency. The B-tree index can be subsequently optimized by queries which do not have concurrency conflicts.

Logging

Recording changes made during the creation or modification of a database is called logging. Logging can allow changes to be rolled back to a more desirable past state. However, in some instances, logging changes can consume significant amount of resources and storage space.

Logging during merge operations in a B-tree index can be minimized by using "non-logged" operations. Non-logged operations actually do generate some log records describing the allocation operations; however, they avoid recording the actual contents of the index and/or database, which is usually the bulk of the log volume. For example, a single page allocation might require 100 bytes of logging, plus another 100 bytes or so for a key insertion into the parent node within the B-tree, but the page contents require 4-32 KB when logged as a new page or even twice that when logged one record at-a-time. Consequently, "non-logged" operations produce a log volume that is miniscule relative to standard (or complete) logging. Specifically, non-logged operations can be used for large B-tree reorganization, partitioned B-tree optimization, and adaptive merging. In some illustrative embodiments, it may be sufficient in B-tree operations to only log space allocation and catalog changes.

According to one illustrative embodiment, non-logging can be performed by retaining the old data structures until the new ones are saved in the database. For example, this might mean that the old data structure (the pages with data that were merged into new partitions) may be retained until the new data structure (the merge output) has been backed up on some backup media. Of course, the old data structures are no longer used for query processing, and query processing is guided to employ the optimized new data structure and ignore the obsolete old data structure.

In summary, the logging volume during merge operations can be reduced to allocation-only logging. In this mode of operation, the page contents are not logged during merge steps, neither deletions in the merge inputs nor insertions in the merge output. Deletion of individual records can be implemented as updates from valid records to "ghost" records (also known as pseudo-deleted records). A single small log record suffices for multiple records. Deletion of entire pages can be captured by a single small log record. Insertion of new pages requires that the new pages be flushed to disk before the data sources for the page contents are erased, i.e., before committing a merge step.

Performance

A comparison of database cracking and adaptive merging in partitioned B-trees may focus on two measures of performance. First, adaptive merging in partitioned B-trees adapts more quickly to a query pattern than database cracking. Second, partitioned B-trees enable better query execution performance than database cracking, even after completion of all optimization.

Figure 10:
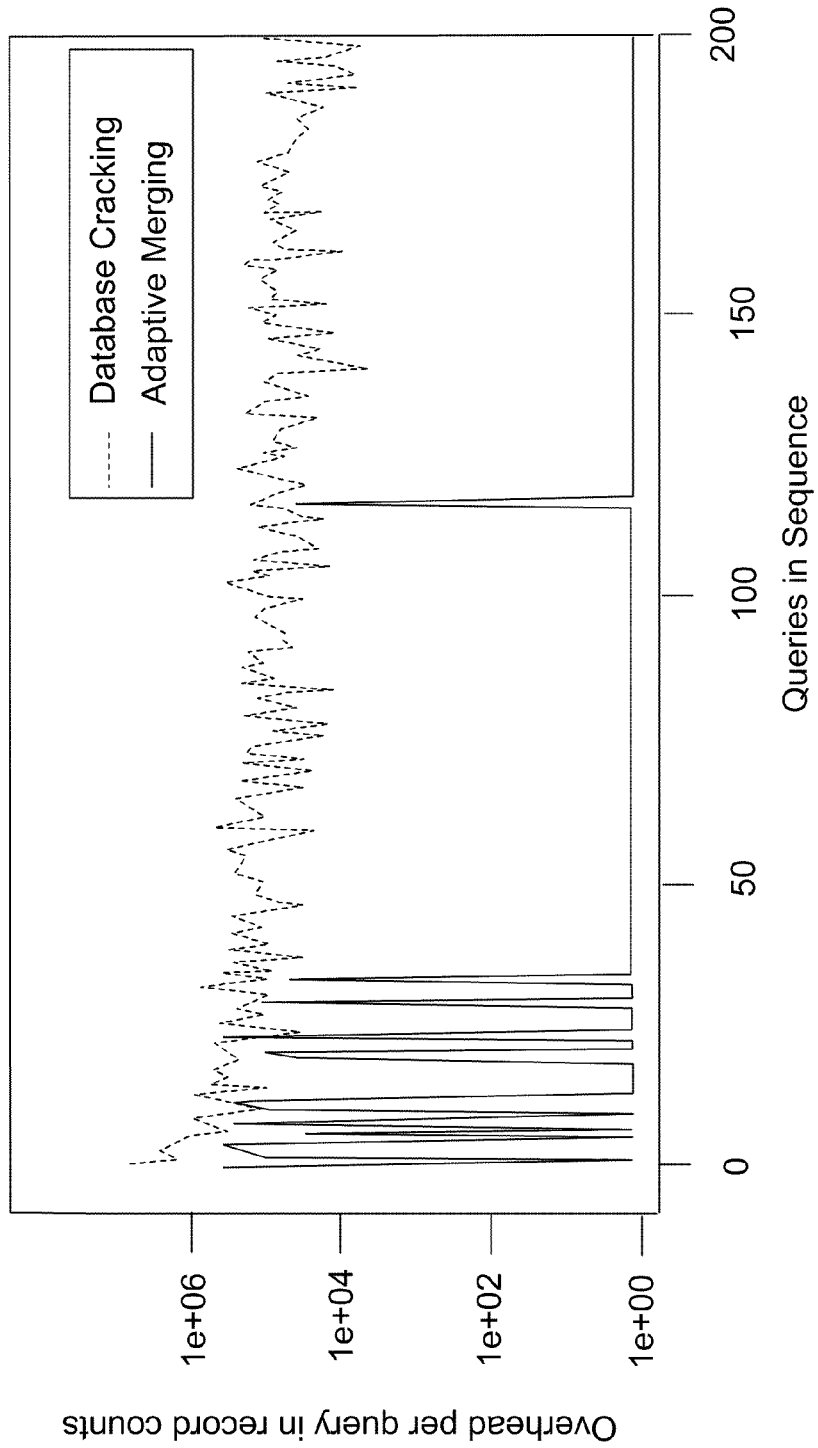
FIG. 10 is an illustrative graph which shows a comparison of query overhead for database cracking and adaptive merging, according to one embodiment of principles described herein.

FIG. 10 is a graph showing test results of a simulation which compared the performance of database cracking and adaptive merging. This simulation made 200 queries against a random permutation of the integers 0 to 9,999,999. Each query requests a random range of 1 value to ¼ of the domain. Cracking stopped with partitions of 10 values. Initial runs in the partitioned B-tree were created with a workspace of 100,000 records, for 51 initial partitions. The merge fan-in is sufficient to all complete B-tree optimization in a single merge level.

FIG. 10 shows the overhead effort of database cracking and of adaptive merging in B-trees. Each query must scan records to produce its output; those are not shown and must be added if the total effort is desired. The cost scale as measured in overhead per query record in FIG. 10 is logarithmic.

Database cracking is shown with a dashed line. It shows the behavior known from an earlier performance study. The first query partitions the entire domain and thus its overhead is high. The overhead then decreases slowly. Each range query provides two more boundary keys between partitions; thus, the number of partitions in a cracker index is about twice the number of queries processed at that point. Further partitioning ends after millions of queries given a domain size of 10,000,000 values.

Adaptive merging in a partitioned B-tree converges much faster. Except for one query, all merging is complete after 35 queries. The exception query merges the last key range not merged in earlier queries. When each query can scan precisely the key range needed as query output, the overhead is zero (shown as 1 due to logarithmic scale).

With a smaller memory allocation during run generation or during merging, multiple merge levels would have been required. For example, convergence would take twice as long with a merge fan-in of only 8 and thus 2 merge levels. Nonetheless, even 100 queries for full convergence would be much faster than database cracking with its strict binary partitioning and thousands of queries prior to steady state. Overhead and convergence rate also depend on the sizes of query ranges as well as skew.

Variants

The concepts described are illustrated above as applied to individual B-trees. However, several variations and optimizations are possible. For example, the concepts apply to clustered and non-clustered indexes as well as to partitions of tables and of indexes. Several illustrative variations and optimizations are described below.

First, partitioned B-trees and the adaptive merging technique are well suited to capturing and indexing continuous streams, in particular if multiple independent indexes are desired for a single stream. Incoming records are always appended to all indexes in partitions formed by run generation. Continuous "trickle updates" in data warehouses are a special case of streams that can be indexed using the proposed techniques. Partitioned B-trees and adaptive merging also promise advantages for concurrency control, logging, and recovery in such environments.

Second, the general technique applies not only to disk-based databases but also to databases on flash devices and even to in-memory databases. The resulting differences are quantitative rather than qualitative. For example, due to very fast access latency, smaller page sizes are optimal for flash devices, resulting in higher merge fan-in with a fixed memory allocation and thus fewer merge levels from initial runs to a final, fully optimized B-tree. For in-memory databases, optimization of cache faults leads to run generation within the cache and explicit merge steps to form memory-sized indexes. These concepts can be combined using self-similar algorithms and data structure to form cache-size in-memory runs, merge those to form initial memory-sized runs on flash, and finally merge those to form initial runs on disk.

Third, partitioned B-trees are useful not only for efficient search but also for efficient query execution with merge joins, "order by" clauses, etc. The final merge activity in the query is precisely equivalent to B-tree optimization, and the merge output can replace the previous partitions with a single, fully optimized partition. Additionally orderings on B-tree fields other than the leading field can be used.

Fourth, partitioned B-trees and adaptive merging provide mechanisms for dynamically adjusting query costs for the purpose of workload management. During index creation, it is possible at any time to defer the remaining key range within the data source. Doing so speeds up the current query but leaves the new index only partially populated. During index optimization, it is possible at any time to reduce the fan-in of merge steps or to interrupt all merge activity in order to defer some merge effort to later queries. Doing so frees up memory (merge input buffers) and speeds up the current query but fails to optimize the key range for subsequent queries.

Fifth, B-tree optimization and partition merging does not depend on queries. Instead, any idle capacity can be used to optimize a partitioned B-tree for future queries. Adaptive merging can focus on those key ranges that have been queried once but are not yet fully optimized. Database cracking, in contrast, cannot exploit prior queries during idle times because it requires a new partitioning key for each additional step.

Finally, instead of merging the precise key range of a query, the logic could be modified to consume entire B-tree leaves. Space management would become simpler and more efficient, whereas the table of contents would become more complex. Consequently, determining the required partitions during query execution would also be more complex. As a compromise, one can extend a query range to the next "short enough" separator key, quite similar to the key optimizations in suffix truncation (compression). For example, if the query range starts with "Smith," the merge could start with "Sm". Even an equality query could merge an appropriate key range, for example all keys starting with "Sm". If suffix truncation is applied during B-tree construction, the probability is high that merge range coincides with boundaries between leaf pages in all input partitions. In fact, such a policy might be very useful to avoid an excessive number of small merge steps and thus to ensure efficient adaptation of an index to a new query pattern. If multiple merge levels are required, the heuristics might differ among the levels in order to avoid repeatedly searching a large number of initial partitions. The experiment illustrated in FIG. 10 extends each merge range in both directions to a multiple of the second-largest power of two smaller than the width of the query range.

These concepts can also work in conjunction with other database management techniques such as dynamic materialized views, bitmap indexes, clustering, etc. For example, if an on-disk data structure is desired that supports combined predicates on multiple columns, one can build a B-tree on a combination of columns (using concatenated columns or a space-filling curve as in UB-trees) and one can employ techniques such as dynamic materialized views to control the contents of a derived data collection and its representation in the database. Materialized views are redundant database tables which contain query results. Dynamic materialized views selectively materialize only some of the rows in a view, for example, only the most frequently accessed rows. Changing which rows are materialized can be done dynamically at run time simply by modifying data in a control table. Consequently, query predicates in the view definition can control the contents of this view.

The concepts also apply to hash indexes if those are B-trees on hash values and to multi-dimensional indexes particularly if they use a space-filling curve such as UB-trees. It applies to indexes on block-access devices such as traditional disks and flash storage as well as to in-memory indexes optimized for CPU caches. Finally, it applies to both primary and secondary B-tree indexes, including multi-column ("compound") B-tree indexes, i.e., to the vast majority of indexes used in practice today.

SUMMARY

In summary, adaptive merging in partitioned B-trees offers a promising alternative to database cracking for automatically and incrementally adapting physical database layout at runtime to support patterns of queries. It achieves this using a standard data structure with only a few non-traditional improvements. First, the artificial leading key field permits creation and removal of partitions by insertion and deletion of records with specific partition identifiers; well-known B-tree access algorithms permit reasonably efficient search in such B-trees. Second, index creation is divided into run generation and merging. Run generation uses a single pass over the future index records and results in a complete, coherent, and searchable B-tree index, even if it is not yet fully optimized. Third, query execution may optimize such an index by merging the key ranges required to answer actual queries, with no effort spent on any unused key ranges. Fourth, those key ranges can readily be searched and optimized later if the query pattern changes.

The described techniques have design goals very similar to database cracking, namely automatic and adaptive index selection as well as incremental optimization of indexes focused on key ranges of interest in actual queries. The fundamental difference between the two approaches is the reliance on partitioning in database cracking and on merging in the new techniques. Well-known related algorithms are partitioning as used in quicksort and merging as used in external merge sort. The main difference in the efficiency of the two techniques is that partitioning (using actual boundary keys of query ranges) is inherently limited to a partitioning fan-out of 2 or 3 whereas the merge fan-in is limited only by the available memory and thus can easily be in the 100s. With the number of partitioning or merging steps required to transform an initial index into the final, fully optimized index inversely proportional to the logarithm of the fan-out or fan-in, database cracking might move each data record 5-10 times more often than adaptive merging in partitioned B-trees. Thus, adaptive merging requires less overall effort and adapts to changes in the query pattern much more rapidly than database cracking. Furthermore, like traditional B-trees and external merge sort, adaptive merging in partitioned B-trees is well suited to block-access storage.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for implementing adaptive merging in database indexes comprises:
   selecting a key range from a database query having a range predicate;
   searching a database for data matching the key range;
   merging the data matching the key range to form a collected data set;
   depositing the merged data within a newly-created partition within the B-tree index;
   making a second database query with a second query predicate which overlaps the key range in the new partition;
   gathering database data which falls within the second query predicate from the database to form a second query answer; and
   depositing a portion of data within the second query answer into the new partition to increase an amount of data contained within the new partition; and
   storing the collected data set for future retrieval,
   in which the data is indexed using a partitioned B-tree.

2. The method of claim 1, further comprising analyzing the range predicate and dividing the range predicate into a plurality of key ranges according to boundary keys in an index table of contents.

3. The method of claim 2, further comprising:
   selecting a key range from the plurality of key ranges; and
   determining if the key range has been merged into a single partition within the partitioned B-tree.

4. The method of claim 3, further comprising if the key range has been merged into a single partition, then retrieving the data within the key range from the single partition.

5. The method of claim 3, further comprising if the key range is distributed across multiple partitions, then:
   retrieving data from the multiple partitions; and
   merging the retrieved data.

6. The method of claim 1, further comprising returning the merged data as a query answer.

7. The method of claim 1, wherein depositing the merged data within the newly-created partition within the B-tree index comprises creating the new partition within the B-tree index.

8. The method of claim 1, wherein concurrency conflicts between answering a database query and merging the data are resolved by forgoing merging the data.

9. The method of claim 1, further comprising:
   receiving a database query having a query predicate with a key range;
   determining if the query predicate contains a variable which is currently unindexed;
   searching a database for records which fall within the query predicate; and
   creating a new index based on the variable.

10. The method of claim 9, further comprising appending new partitions to the new index for subsequent queries of the same variable which have a different key range.

11. The method of claim 1, further comprising loading new data into the partitioned B-tree into one or more new partitions, the size of the new partitions varying according to a size of memory allotted for the run generation of the new data.

12. The method of claim 1, further comprising scaling fan-in used in merging the data according to available computing resources.

13. A method for optimizing B-tree representation of a database using actual queries, the method comprising:
   creating a partitioned B-tree index as a representation of a set of data, the partitioned B-tree index being configured to have multiple partitions, the multiple partitions being defined by an artificial leading key field;
   receiving results of a database query having a predicate;
   analyzing the predicate and dividing the predicate into a plurality of key ranges according to boundary keys in an index table of contents;
   if a B-tree index does not exist for the predicate, automatically creating a new B-tree index organized by the predicate; and
   if a B-tree index does exist for the predicate, searching the B-tree index for index records which fall within the key ranges and adaptively merging the index records which fall within the key ranges into one or more new partitions within the partitioned B-tree index.

14. A computer program product for implementing adaptive merging in database indexes, the computer program product comprising:
   a non-transitory computer readable storage medium comprising computer usable program code embodied therewith, the computer usable program code to, when executed by a processor:
      select a key range from results of a database query having a range predicate;
      search a database for data matching the key range;
      merge the data matching the key range to form a collected data set;
      make a second database query with a second query predicate which overlaps the key range in the new partition;
      gather database data which falls within the second query predicate from the database to form a second query answer;
      deposit a portion of data within the second query answer into the new partition to increase an amount of data contained within the new partition; and
      store the collected data set for future retrieval,
      in which the data is indexed using a partitioned B-tree.

15. The computer program product of claim 14, further comprising:
   computer usable program code to, when executed by a processor, analyze the range predicate and dividing the range predicate into a plurality of key ranges according to boundary keys in an index table of contents;
   computer usable program code to, when executed by a processor, select a key range from the plurality of key ranges; and
   computer usable program code to, when executed by a processor, determine if the key range has been merged into a single partition within the partitioned B-tree.

16. The computer program product of claim 14, further comprising:
   computer usable program code to, when executed by a processor, create a new partition within the B-tree index; and
   computer usable program code to, when executed by a processor, deposit the merged data within the new partition for future retrieval.

* * * * *